(12) United States Patent
Bonanno et al.

(10) Patent No.: US 10,506,381 B2
(45) Date of Patent: Dec. 10, 2019

(54) SYSTEMS AND METHODS FOR SENSING AND LOCATING PASSIVE ELECTRONIC DEVICES

(71) Applicant: Archetype SC, Inc., Myrtle Beach, SC (US)

(72) Inventors: Joseph W. Bonanno, Myrtle Beach, SC (US); Patrick J. Nord, Myrtle Beach, SC (US)

(73) Assignee: ARCHETYPE SC, INC., Myrtle Beach, SC (US)

( * ) Notice: Subject to any disclaimer, the term of this patent is extended or adjusted under 35 U.S.C. 154(b) by 0 days.

(21) Appl. No.: 16/004,884

(22) Filed: Jun. 11, 2018

(65) Prior Publication Data

US 2018/0359609 A1 Dec. 13, 2018

Related U.S. Application Data

(60) Provisional application No. 62/517,975, filed on Jun. 11, 2017.

(51) Int. Cl.
| | | |
|---|---|---|
| *H04W 4/029* | (2018.01) | |
| *H04W 4/02* | (2018.01) | |
| *H04W 4/38* | (2018.01) | |
| *H04B 17/27* | (2015.01) | |
| *H04B 17/318* | (2015.01) | |

(52) U.S. Cl.
CPC ............ *H04W 4/029* (2018.02); *H04B 17/27* (2015.01); *H04W 4/027* (2013.01); *H04W 4/38* (2018.02); *H04B 17/318* (2015.01)

(58) Field of Classification Search
CPC ....... H04W 24/02; H04W 4/023; H04W 4/50; H04W 4/70; H04W 4/80; H04B 1/1607; H04B 1/3833; H04B 7/18504; H04B 7/2606
See application file for complete search history.

(56) References Cited

U.S. PATENT DOCUMENTS

| | | | | |
|---|---|---|---|---|
| 10,187,773 B1 * | 1/2019 | Zalewski | ................ | H04L 67/10 |
| 2017/0302363 A1 * | 10/2017 | Fan | .................... | H04B 7/18504 |
| 2018/0375567 A1 * | 12/2018 | Fan | .................... | H04B 7/18504 |

* cited by examiner

*Primary Examiner* — Diane D Mizrahi
(74) *Attorney, Agent, or Firm* — Morris Manning & Martin; Daniel E. Sineway, Esq.

(57) ABSTRACT

A system and method for detecting passive devices is provided. In various embodiments, the system includes a sensor device including a sensor module, a communications module, a processor, and a memory storing instructions, that when executed by the processor, cause the sensor module to receive a passive signal broadcast by a target device, assign a signal type to the passive signal to form passive signal data, and transmit the passive signal data to a central device or cloud. The system also includes a central device or cloud configured to receive the passive signal data from the sensor device.

20 Claims, 12 Drawing Sheets

EXEMPLARY GEO-FENCE SENSOR ARRANGEMENT

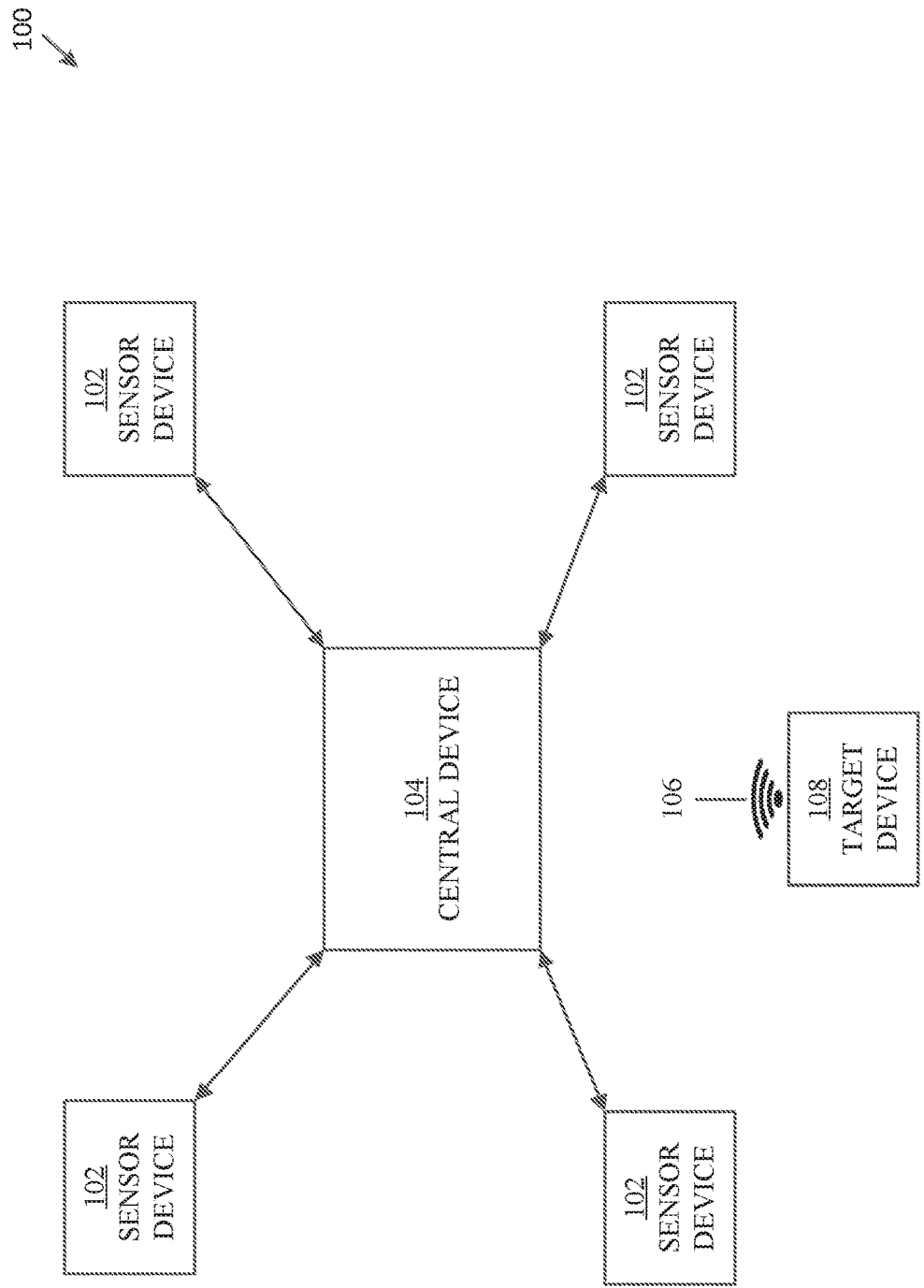

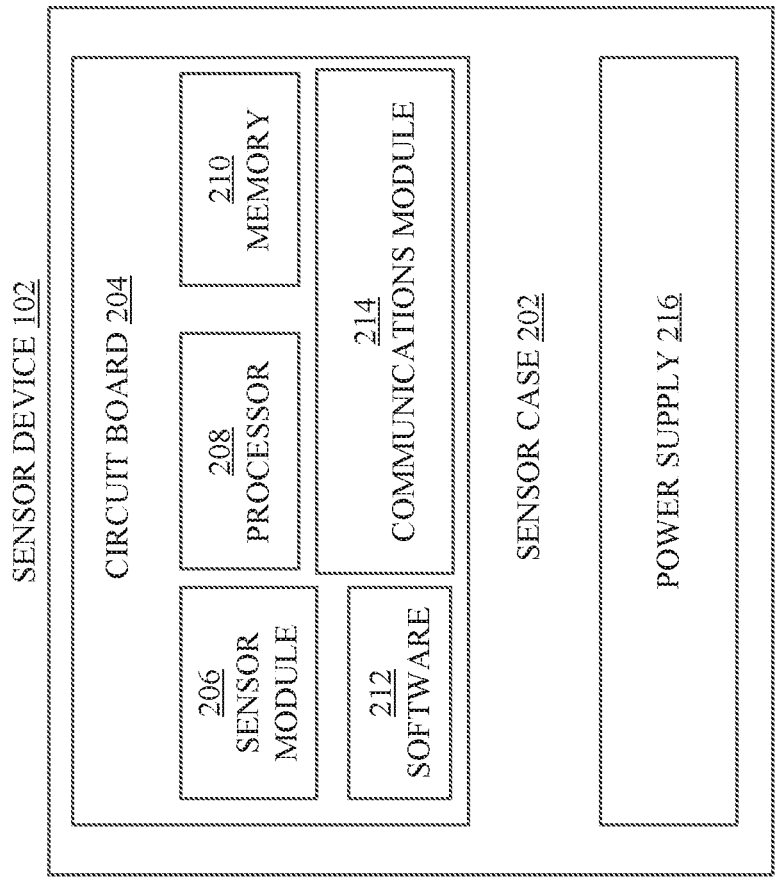
FIG 2: BLOCK DIAGRAM OF EXEMPLARY SENSOR UNIT

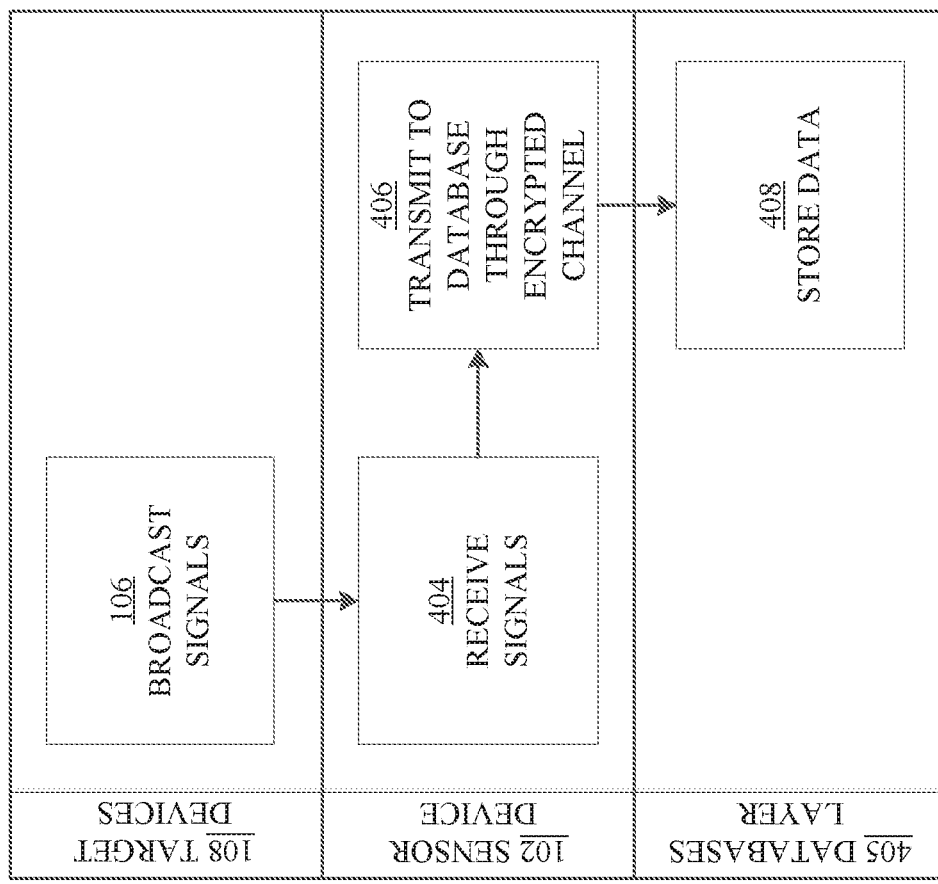
FIG 4: EXEMPLARY DATA FLOW

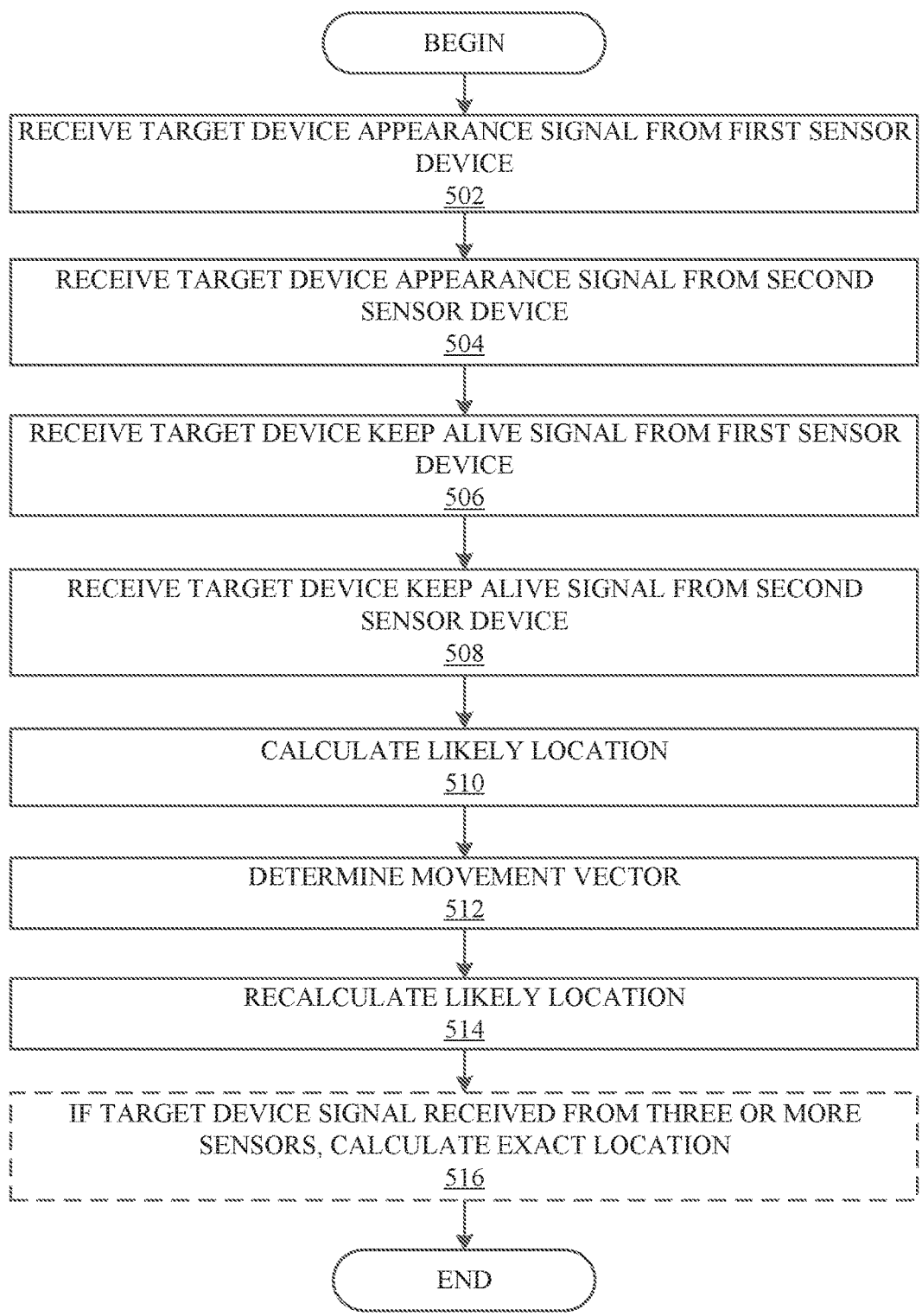
FIG. 5: EXEMPLARY LOCATION LOGIC PROCESS

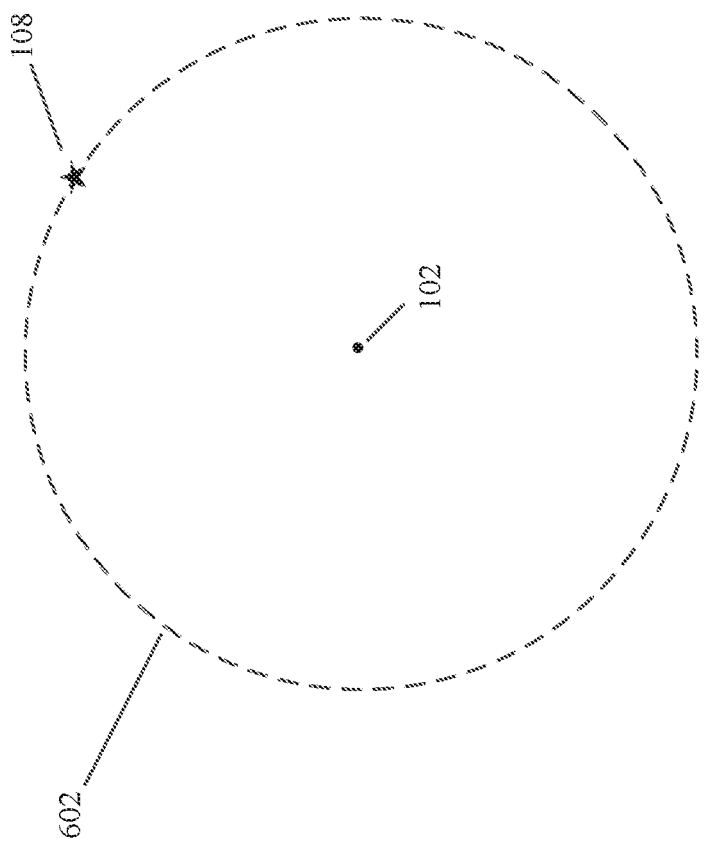
FIG 6: EXEMPLARY LOCATION DETERMINATION FOR SINGLE SENSOR DETECTION

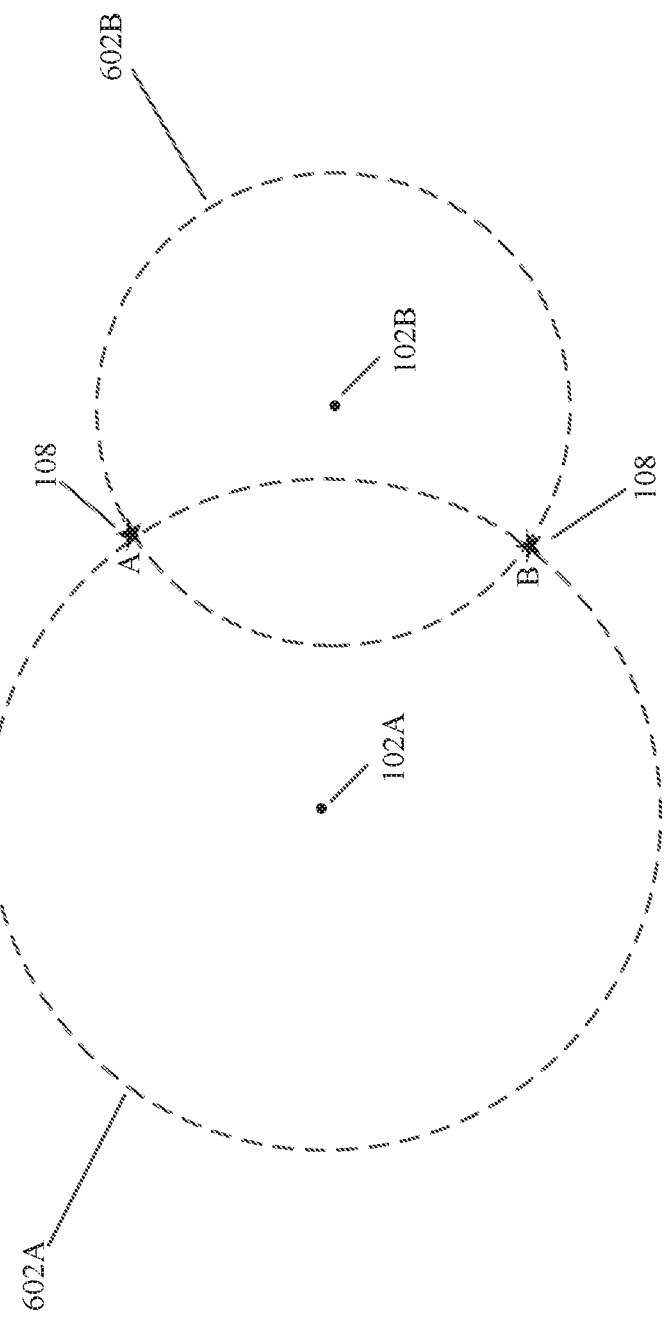
FIG 7: EXEMPLARY LOCATION DETERMINATION FOR TWO-SENSOR DETECTION

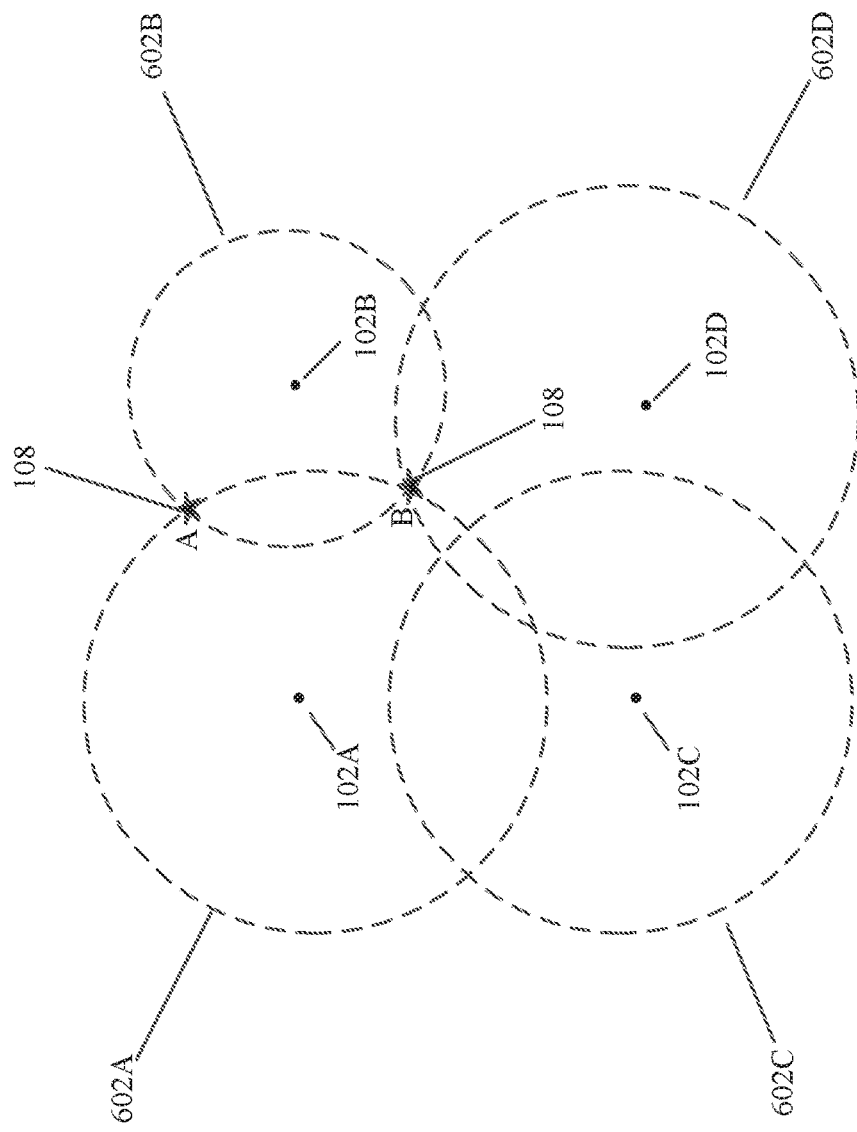
FIG 8: EXEMPLARY LOCATION DETERMINATION FOR MULTIPLE-SENSOR DETECTION

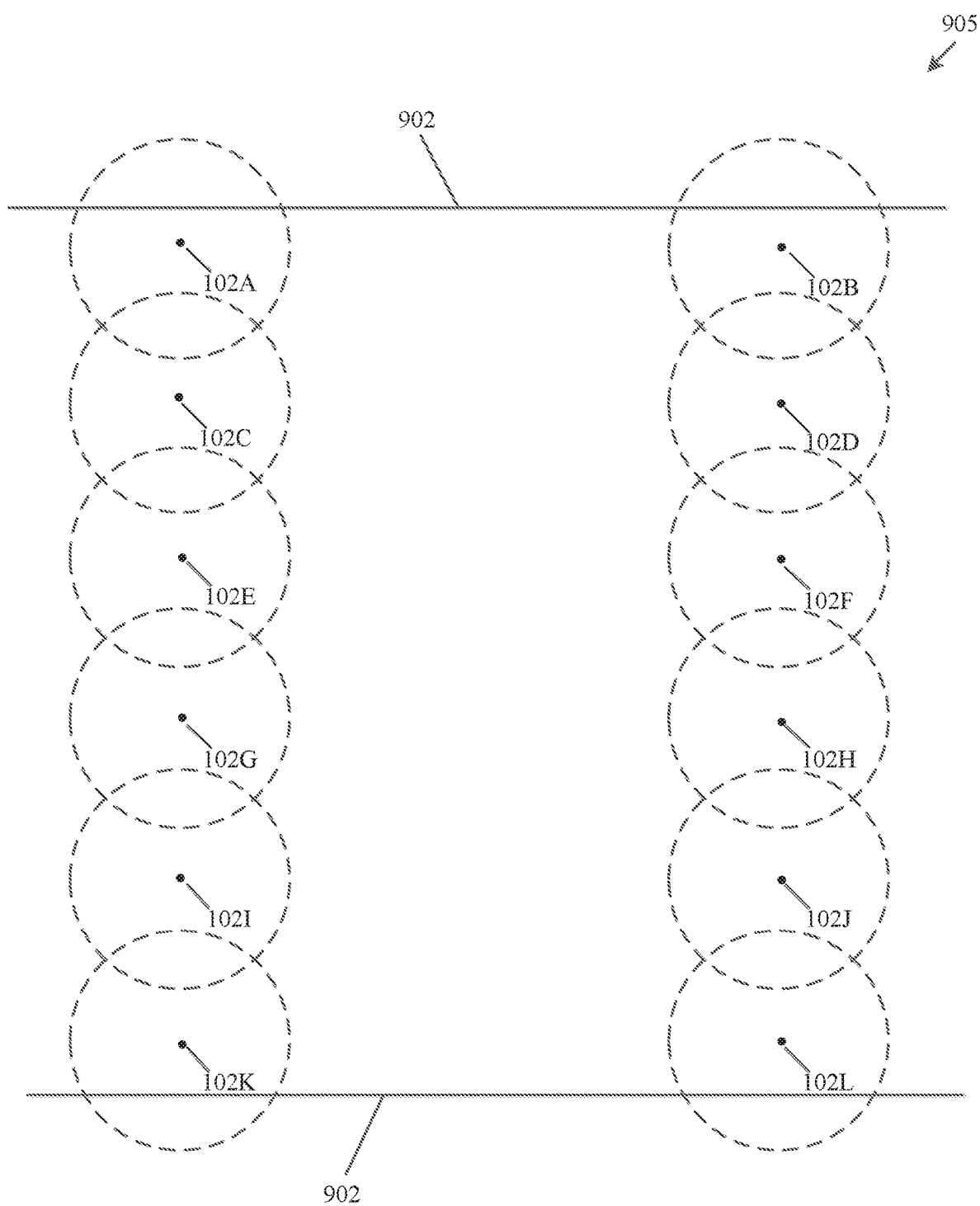
FIG. 9: EXEMPLARY GEO-FENCE SENSOR ARRANGEMENT

SYSTEMS AND METHODS FOR SENSING AND LOCATING PASSIVE ELECTRONIC DEVICES

CROSS REFERENCE TO RELATED APPLICATIONS

This application claims priority to, the benefit under 35 U.S.C. § 119 of, and incorporates by reference herein in its entirety U.S. Provisional Patent Application No. 62/517,975, filed Jun. 11, 2017, and entitled "Systems and Methods for Sensing and Locating Passive Electronic Devices."

TECHNICAL FIELD

The present systems and methods relate generally to sensor systems, and more particularly to sensor systems and methods for location of passive devices.

BACKGROUND

In today's data-driven society, gathering data is a key component of any consumer-facing business entity. Consumer interaction and behavior are critical data points that provide value in many different aspects of business operations. Tracking and recording consumer movement within a facility can provide insight on consumer usage, people flow, and assist in optimizing facility layouts. One such method of consumer movement tracking involves tracking electronic, signal-emitting devices attached to, and in-use by, the human body (e.g., smartphones, Bluetooth headphones, fitness trackers, etc.). Such tracking leverages the increasing prevalence of smartphones and wearable technology, as those devices are often connected to, and associated with, a single user.

Current technology, however, relies on individual users "opting in" to location tracking services for internet connected devices (most often "smart phones," but also tablets and automobiles among other devices). Opt in occurs either through installation of a third party application ("app") or through agreement to terms of services on connection to a broadcast Wi-Fi signal. Requiring an active opt-in effectively dampens the number of devices available for tracking. Some users actively opt out of location services. Others do not install the third party applications or do not connect to the wireless network. Whether through active or passive choices, a significant portion of the devices are not reported. Furthermore, numerous "dark devices" that are not internet connected, or turned off, also exist. Such devices are not currently tracked in any way. Such devices range, for example, from Wireless Headphones, to fitness trackers, to GPS devices.

Therefore, there is a long-felt but unresolved need for a system or method that can detect and aggregate passive electronic signals, such that position/location data can be triangulated and recorded, analyzed, and manipulated.

BRIEF SUMMARY OF THE DISCLOSURE

According to various aspects of the present disclosure, and in one embodiment, the present systems and methods include one or more sensor devices, algorithms, and software instructions to permit collection and processing of data from passive devices. The systems and methods provided herein permit collection of data from passive devices, providing unique and valuable insights into how people move, interact, and ultimately what influences decisions.

In each instance, passive information is broadcast from each unreported, opted out, or dark device (passive device) in a manner that publically advertises significant information regarding the device, including but not limited to: a unique identifier, a device identifier, a brand identifier, a serial number, an event type, an identifier type, signal strength, signal fluctuations, etc. Although such devices and passive signals are known to exist, it is conventionally not possible to aggregate en masse the signals, triangulate position/ location, and use the information for further analysis. In particular, the passive signal data, when collected in large enough quantities cannot be conventionally processed in real time. Furthermore, due to the fluctuations in signals such as Bluetooth, Bluetooth Low Energy (BLE), and Wi-Fi, the ranging effects of interferences, and amplification effects, passive data has conventionally been considered unusable data. Expanding into these previously dark areas of data permits improvement of the user experience that individuals seek out and are accustomed to receiving in a digital world, as well as improved device location, surveillance, and security.

In various embodiments, the systems and methods described herein can, for example, allow for significant new data to be obtained and analyzed, resulting in a heretofore hidden wealth of information. Individuals have become used to "targeted" marketing, just-in-time assistance, product suggestions and pairings, and countless other personalizations in the digital environment. In one or more embodiments, the systems and methods described herein bring the ability to offer consumers that experience in the physical world. Furthermore, although data is collected from devices, to avoid privacy violations or complaints, in particular embodiments, no personally identifiable information is accessed, collected, or stored at any point in this process or as a result of any aspect of the systems and methods described.

According to particular embodiments, a method for facilitating location-tracking of wireless electronic devices, including the steps of: receiving a first signal at a first electronic sensor device from a wireless electronic device, the first signal including a first measure of relative signal strength ("RSSI") emitted by the wireless electronic device, wherein the first electronic sensor device is located at a first position within an area; receiving a second signal at the first electronic sensor device from the wireless electronic device, the second signal including a second measure of RSSI emitted by the wireless electronic device, wherein the first signal and the second signal are received by the first electronic sensor device within a predetermined acceptable time period; receiving a third signal at a second electronic sensor device from the wireless electronic device, the third signal including a third measure of RSSI emitted by the wireless electronic device, wherein the second electronic sensor device is located at a second position within the area; receiving a fourth signal at the second electronic sensor device from the wireless electronic device, the fourth signal including a fourth measure of RSSI emitted by the wireless electronic device, wherein the third signal and the fourth signal are received by the second electronic sensor device within the predetermined acceptable time period; and determining an estimated location of the wireless electronic device in the area based on the first position and second position of the first electronic sensor device and the second electronic sensor device, a change between the first measure of RSSI and the second measure of RSSI, and a change between the third measure of RSSI and the fourth measure of RSSI.

According to one aspect of the present disclosure, the method herein, wherein each of the first signal, the second signal, the third signal, and the fourth signal include passive signals. Additionally, the method herein, wherein passive signals include signals not actively initiated by a user of the wireless electronic device. Furthermore, the method herein, wherein each of the first signal, the second signal, the third signal, and the fourth signal further include a unique identifier that identifies the wireless electronic device. Moreover, the method herein, wherein each of the first signal, the second signal, the third signal, and the fourth signal further include respective date/time stamps to confirm that the signals are received by the first electronic sensor device and the second electronic sensor device within the predetermined acceptable time period. Also, the method herein, further including the step of determining a movement vector of the wireless electronic device. Additionally, the method herein, wherein the movement vector is determined by calculating an angle of change between the first signal and the second signal, and also the third signal and the fourth signal. Further, the method herein, further including the step of updating the estimated location of the wireless electronic device based on the movement vector.

According to one aspect of the present disclosure, the method herein, further including the steps of: receiving a fifth signal at a third electronic sensor device from the wireless electronic device, the fifth signal including a fifth measure of RSSI emitted by the wireless electronic device, wherein the third electronic sensor device is located at a third position within the area; receiving a sixth signal at the third electronic sensor device from the wireless electronic device, the sixth signal including a sixth measure of RSSI emitted by the wireless electronic device, wherein the fifth signal and the sixth signal are received by the third electronic sensor device within the predetermined acceptable time period; and determining an updated location of the wireless electronic device in the area based on the first position, second position, and third position of the first electronic sensor device, the second electronic sensor device, and the third electronic sensor device, as well as a change between the first measure of RSSI and the second measure of RSSI, a change between the third measure of RSSI and the fourth measure of RSSI, and a change between the fifth measure of RSSI and the sixth measure of RSSI. Additionally, the method herein, wherein the electronic sensor devices are capable of reading passive signals from the wireless device.

According to particular embodiments, a system for facilitating location-tracking of wireless electronic devices, including: a first electronic sensor device located at a first position within an area, the first electronic sensor device operative to: receive a first signal from a wireless electronic device, the first signal including a first measure of relative signal strength ("RSSI") emitted by the wireless electronic device; and receive a second signal from the wireless electronic device, the second signal including a second measure of RSSI emitted by the wireless electronic device, wherein the first signal and the second signal are received by the first electronic sensor device within a predetermined acceptable time period; a second electronic sensor device located at a second position within the area, the second electronic sensor device operative to: receive a third signal from the wireless electronic device, the third signal including a third measure of RSSI emitted by the wireless electronic device; and receive a fourth signal from the wireless electronic device, the fourth signal including a fourth measure of RSSI emitted by the wireless electronic device, wherein the third signal and the fourth signal are received by the second electronic sensor device within the predetermined acceptable time period; and a central server in operative communication with the first electronic sensor device and the second electronic sensor device, wherein the central server includes a processor and is operative to determine an estimated location of the wireless electronic device in the area based on the first position and second position of the first electronic sensor device and the second electronic sensor device, a change between the first measure of RSSI and the second measure of RSSI, and a change between the third measure of RSSI and the fourth measure of RSSI.

According to one aspect of the present disclosure, the system herein, wherein each of the first signal, the second signal, the third signal, and the fourth signal include passive signals.

Additionally, the system herein, wherein passive signals include signals not actively initiated by a user of the wireless electronic device. Furthermore, the system herein, wherein each of the first signal, the second signal, the third signal, and the fourth signal further include a unique identifier that identifies the wireless electronic device. Also, the system herein, wherein each of the first signal, the second signal, the third signal, and the fourth signal further include respective date/time stamps to confirm that the signals are received by the first electronic sensor device and the second electronic sensor device within the predetermined acceptable time period. Moreover, the system herein, wherein the central server is further operative to determine a movement vector of the wireless electronic device. Additionally, the system herein, wherein the movement vector is determined by calculating an angle of change between the first signal and the second signal, and also the third signal and the fourth signal. Further, the system herein, wherein the central server is further operative to update the estimated location of the wireless electronic device based on the movement vector.

According to one aspect of the present disclosure, the system herein, further including: a third electronic sensor device located at a third position within the area, the third electronic sensor device operative to: receive a fifth signal from the wireless electronic device, the fifth signal including a fifth measure of RSSI emitted by the wireless electronic device; and receive a sixth signal from the wireless electronic device, the sixth signal including a sixth measure of RSSI emitted by the wireless electronic device, wherein the fifth signal and the sixth signal are received by the third electronic sensor device within the predetermined acceptable time period; and the central server operative to determine an updated location of the wireless electronic device in the area based on the first position, second position, and third position of the first electronic sensor device, the second electronic sensor device, and the third electronic sensor device, as well as a change between the first measure of RSSI and the second measure of RSSI, a change between the third measure of RSSI and the fourth measure of RSSI, and a change between the fifth measure of RSSI and the sixth measure of RSSI. Additionally, the system herein, wherein the electronic sensor devices are capable of reading passive signals from the wireless device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary system environment, according to one embodiment of the present disclosure.

FIG. 2 is a block diagram of an exemplary sensor unit, according to one embodiment of the present disclosure.

FIG. 4 is a sequence diagram illustrating exemplary data flow, according to one embodiment of the present disclosure.

FIG. 5 is an exemplary flowchart illustrating exemplary location logic, according to one embodiment of the present disclosure.

FIG. 6 illustrates exemplary location determination for single-sensor detection, according to one embodiment of the present disclosure.

FIG. 7 illustrates exemplary location determination for two-sensor detection, according to one embodiment of the present disclosure.

FIG. 8 illustrates exemplary location determination for multiple-sensor detection, according to one embodiment of the present disclosure.

FIG. 9 illustrates an exemplary geo-fence sensor arrangement, according to one embodiment of the present disclosure.

DETAILED DESCRIPTION

Figure 3A:
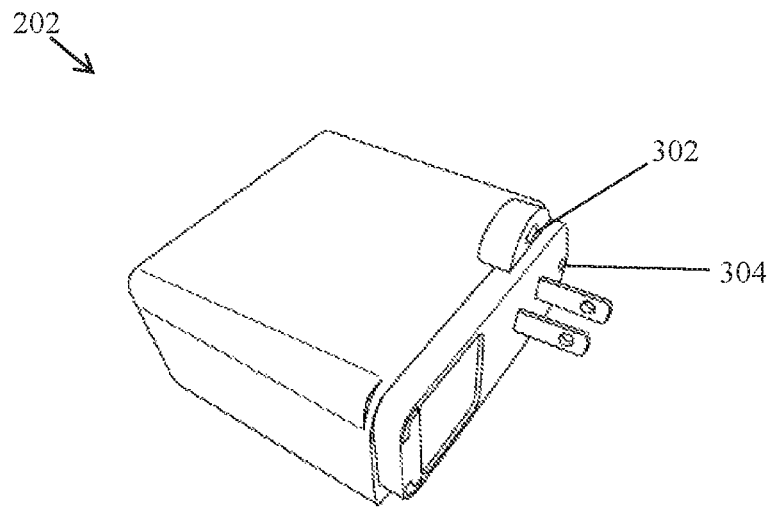
FIG. 3A, FIG. 3B, and FIG. 3C illustrate isometric views of a sensor case, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Various exemplary embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity Like numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Devices, systems and methods are disclosed herein including one or more sensor devices, algorithms, and software instructions to permit collection and processing of data from passive devices. This technology combines an elegant sensor with highly scalable and elastic data structures, powered by self-correcting algorithms. By taking into account and compensating for second by second fluctuations in interference and learning from similar situations, the algorithm powering the analysis achieves a level of precision, speed, and flexibility previously unattainable. The systems and methods provided herein permit collection of data from all passive devices, providing unique and valuable insights into how people move, interact, and ultimately what influences decisions. Expanding into these previously dark areas of data permits improvement of the user experience that individuals seek out and are accustomed to receiving in a digital world as well as improved device location, surveillance, and security, not to mention the functionality of location determination and passive data gathering themselves.

The systems and methods described herein can, for example, allow for significant new data to be obtained and analyzed, resulting in a heretofore hidden wealth of information. Individuals have become used to "targeted" marketing, just-in-time assistance, product suggestions and pairings, and countless other personalizations in the digital environment. The technology brings the ability to offer that level of experience in the physical world. Furthermore, although data is collected from devices, no personally identifiable information is accessed, collected, or stored at any point in this process or as a result of any aspect of the technology described.

EXEMPLARY EMBODIMENTS

Referring now to the figures, for the purposes of example and explanation of the fundamental processes and components of the disclosed systems and methods, reference is made to FIG. 1, which illustrates an exemplary, high-level overview 100 of one embodiment of the systems and methods herein. As will be understood and appreciated, the exemplary, high-level overview 100 shown in FIG. 1 represents merely one approach or embodiment of the present system, and other aspects are used according to various embodiments of the present system.

As shown in FIG. 1, in particular embodiments, a system may include one or more sensor devices 102 and a central device 104 for communicating with, and/or receiving data from, the sensor devices 102. In various embodiments, the central device 104 may include a physical server and/or a virtual server, processor, database, plug computer, or any combination of these components. In various embodiments, the one or more sensor devices 102 may detect one or more passive signals 106 broadcast by one or more target devices 108 (e.g., smartphones, tablet computers, laptop computers, Mp3 players, electronic readers, etc.).

Devices (e.g., target devices 108) equipped for wireless connection via Wi-Fi, Bluetooth, or other means of wireless communication, passively emit data signals 106. In various embodiments, these signals are used for a variety of functions, including but not limited to, communication between a target device 108 and a trusted auxiliary device (e.g., a smartphone and a wearable fitness tracker), network communication, identification, location tracking, etc. In these embodiments, it is preferable that the signal 106 is frequently transmitting with the intent to find a trusted device, identify unknown devices, or transmit data to a "paired" device. In one or more embodiments, each signal transmits a variety of information, with each transmitter being unique, but typically include at minimum: a unique identifier (UID) and measure of relative signal strength (RSSI). Additionally, in at least one embodiment, the type of signal can also be determined (e.g., Bluetooth, Wi-Fi, etc.).

Assume, as a discussion example, that a passenger is walking through an airport terminal carrying a smartphone (e.g., target device 108). As discussed above, the passenger's smartphone is continuously emitting passive signals 106 that include device specific information. In this example, the airport is equipped with several sensor devices 102 positioned throughout the airport, whereby passive signals 106 emitted from target devices 108 (e.g., the passenger's smartphone) may be recognized and recorded by the several sensor devices 102 and relayed to the central device 104 for further processing. Continuing with the present example, the several sensors 102 positioned throughout the airport may capture and record in a central device 104 a unique identifier of the passenger's smartphone, such that the passenger's smartphone (e.g., target device 108) may be tracked. Furthermore, in this example, the several sensor devices 102 may also capture and record in a central device 104 the RSSI of the passenger's smartphone, such that the location and/or movement of the passenger's smartphone (e.g., target device 108) may be logged and/or predicted.

As will be understood from the discussions herein, the above particular example is merely exemplary functionality of the systems and methods described herein. For example, the above describes a passenger walking through an airport, but the systems and methods herein may be useful for any use regarding location mapping using passively emitted signals from electronic devices, such as in retail stores, hospitals, amusement parks, etc.

Turning now to FIG. 2, a block diagram of an exemplary sensor unit 102 is shown, according to one embodiment of the present disclosure. In various embodiments, the sensor device 102 (also referred to as "sensor" or "receiver") may include a circuit board 204 (or microchip) equipped with a sensor module 206 to monitor wireless (Wi-Fi), Bluetooth (including BLE), and other wireless communication passively transmitted by a variety of target devices 108. In some embodiments the sensor device 102 or devices may also include software 212, stored in a memory 210, that when executed by a processor 208, may direct the sensor module 206 to capture the passive signal data 106 and may, in some embodiments, direct a communications module 214 to relay the captured signal to, for example, the central device 104.

The sensors 102 may, in some embodiments, be designed to "monitor" all passive wireless signals 106 in a given location. This can be accomplished through, for example, software 212 and a physical chipset, or processor 208, optimized and minimized for collection. The software 212, in some embodiments, may be designed to run locally on the circuit board 204 in a secure storage location. In some embodiments, the software 212 may add additional information to the monitored signal 106. For example, the software may add a unique identifier (UID) of the receiver, an exact time and date stamp of reception of the signal, and identification of the signal type as first contact ("appearance"), on-going ("keep-alive"), or last contact ("disappearance"). This information may be stored in a database, either locally or streamed to a virtual database environment to be securely housed. Each signal 106 is tagged as a unique point of data, and is stored with an individual UID. The sensors 102 may be configured to capture signals from hundreds, if not thousands of transmitter devices simultaneously.

In particular embodiments, the sensor module 206 may be configured to capture transmissions at variable intervals, with a minimum capture rate of 0.1 seconds per capture, and no maximum capture rate. In various embodiments, the sensor module 206 may capture signals within an effective range up to, and including 750 ft (e.g., 10 ft, 50 ft, 125 ft, 500 ft, etc.). During a latent period, signals may not be detected or recorded. In some embodiments, the software 212 may be configured to transmit received data immediately or in bursts of aggregated data.

Still referring to FIG. 2, in various embodiments, the sensor device 102 may include a configurable circuit board 204. In particular embodiments, the configurable circuit board 204 may include a processor 208 (e.g., a single core, 1 GHz ARM processor (32 bit), or any other suitable processor) and onboard memory 210 (e.g., 512 MB of onboard RAM or any other suitable memory). In some embodiments, the communications module 214 may include a wireless card and/or a Bluetooth module. For example, in some embodiments, the circuit board 204 may include an 802.11 wireless card (b/g/n), and Bluetooth capabilities (4.1 and BLE). In one or more embodiments, any hardware may be selected for use with the software 212, and to optimize performance with respect to data collection.

In particular embodiments, the sensor devices 102 may be powered by a single power supply 216. In at least one embodiment, the power supply 216 may be integrated with the sensor case 202 as described with greater detail below in FIG. 3. Each sensor device, in some embodiments, can be configured to auto-reboot, and auto-restart the correct software 212 in case of a power outage.

Figure 3B:
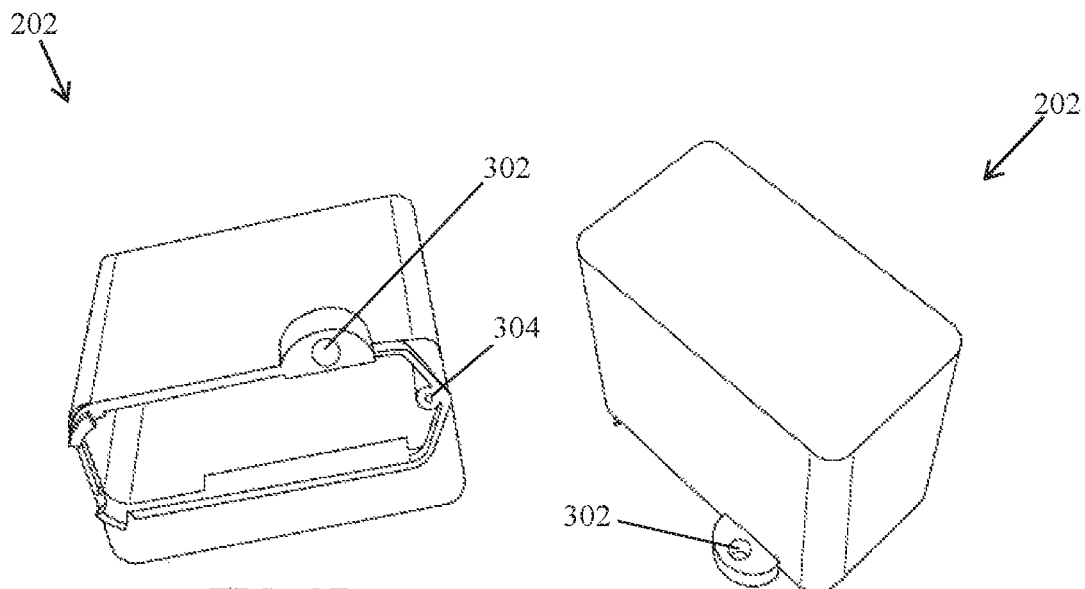
Figure 3C:
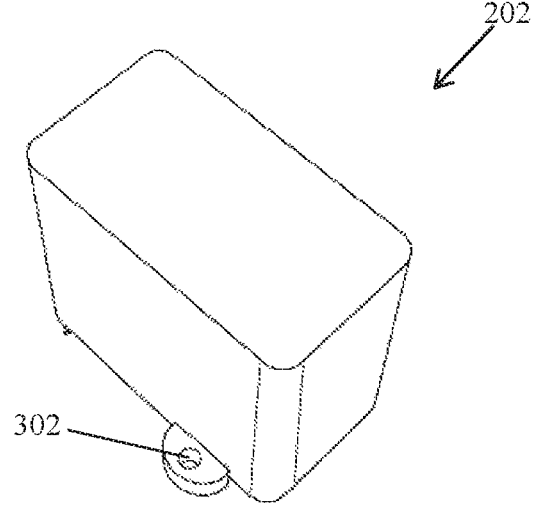

FIGS. 3A, 3B, and 3C show isometric views of a sensor case 202, according to one embodiment of the present disclosure. In various embodiments, the sensors 102 may be enclosed in a custom designed case 202, for protecting the chipset while minimizing interference to the sensor module 206. The case 202 may integrate the necessary power supply 216 in close proximity to the sensor module 206, while limiting interference and minimizing heat production, which are typical in a closed environment. In some embodiments, to further protect the sensor module 206, the case 202 may be closed by a screw, inserted into an outer screw opening 302. In certain embodiments, a second screw may be used to secure the case 202 to a standard wall outlet, by inserting it into an inner screw opening 304. In at least one embodiment, the outer screw opening 302 and the inner screw opening 304 may contain screws between 0 and 24 gauges in size, and between 0.25 inches and 3.0 inches in length.

In various embodiments, the sensor case 202 may be configured to permit a simple pairing of the circuit board 204 and the power supply 216 in a single case 202. In some embodiments, the case 202 may also be configured to permit the sensor module 206 and the circuit board 204 to be secured to the outlet.

The case 202, in particular embodiments, may be molded out of any radiotransparent material (e.g., Formlabs® standard resin), and may be designed to promote signal strength of the sensor device 102 as well as security of the device and accessibility to the standard wall outlet. In some embodiments, the case 202 may be molded less than 2 mm thick to allow for free flow of data through a majority of the device. In at least one embodiment, the molded material may provide a strong case 202 that is shock resistant and durable.

Within the case 202, in certain embodiments, the circuit board 204, and thus the sensor module 206, may be located in an upper portion of the case 202 (away from the outlet) and mounted to a top inside wall of the case 202. In various embodiments, the sensor module 206 may be positioned on an outside edge of the circuit board 204 facing the outside wall of the case 202. In these embodiments, this positioning may free the sensor module 206 from interference from the power supply 216, as well as other sensor modules 206 that may be positioned on the circuit board. In one or more embodiments, the sensor module 206 may be separated from the power supply 216 by a minimum clearance of 0.25 inches.

Passive Data Analysis and Passive Device Location

In various embodiments, to identify a device with precise accuracy (e.g., as close as one inch or less with respect to the actual, physical location of the device), the data from each sensor 102 may be combined and analyzed using a novel triangulation algorithm. The triangulation algorithm, in some embodiments, may place a relative RSSI based weighting coefficient to account for the potential significant variation in device circuit boards 204, ambient interference, potential piconet amplification affects, or other variables. In one or more embodiments, the novel triangulation algorithm may be executed from a central processing unit included in the central device 104 and/or a virtual computing environment.

Conventional techniques for geo-locating based on variable RSSI are inaccurate, primarily because they lack the coefficient calculation necessary to determine accurate relative weighting. The variety of heights at which target devices exist, and the spatial mobility of these devices adds a second complicating factor to typical triangulation methods. In various embodiments, each target device 108 emits a spherical signal that can be adjusted in any direction.

In the embodiments described, the methods and systems described herein may overcome this deficiency of geo-locating by placing the sensor devices on a 3D grid, although this is typically unfeasible for most locations of deployment, particularly those locations that contain multiple floors or levels. However, this unfeasibility is taken into account in the development of the weighted RSSI coefficient. To determine the weighted RSSI coefficient, in one or more embodiments, a formula takes the first appearance signal of the target device 108 and defines that RSSI as a standard of one. In particular embodiments, as future first appearances of the target device 108 are detected by other sensor devices 102, the future first appearances are recorded to weight the results from that individual sensor 102. In some embodiments, when the "disappearance" signal is recorded, or the last keep alive signal is recorded, if no distinct disappear event is captured, the RSSI of the disappearance or last keep alive signal is compared to the original RSSI for further weighting. In various embodiments, variance is detected and accounted for in the computation, significantly increasing accuracy. In some embodiments, each distinct type of signal captured and recorded may be independently processed (e.g., the Wi-Fi signal from a target device 108 is processed independent of the Bluetooth signal, etc.). In particular embodiments, this independent processing allows for independent cross-checking of accuracy without cross-contamination.

Additionally, in one or more embodiments, the problem of variable interference can also be accounted for in an algorithm. In various embodiments, the formula can constantly predict the next expected location, based on previous rate of change, known interference, and known vector. In particular embodiments, variance between predicted and actual location is noted, and when it falls outside of tolerances, the weighted coefficients are adjusted so as to enable a more accurate result.

Data Transfer

FIG. 4 is a sequence diagram illustrating exemplary data flow, according to one embodiment of the present disclosure. In various embodiments, the flow of data begins when target devices 108 broadcast signals 106. The signals broadcasted, in various embodiments may contain data packets that include target device 108 information, such as a target device ID, target device hash ID, target device RSSI, etc.

As shown in FIG. 4, the exemplary data flow continues as a sensor device 102 receives the signals 404 broadcasted by the target devices 108. In at least one embodiment, in addition to the data received from the target device 108, the sensor device may attach additional information to the data packets, such that each row of data may contain the target device ID, target device hash ID, target device RSSI, target device signal type (appearance, keep-alive, or disappearance), distance between the signal and the sensor device, sensor device ID, date of recording, time of recording, etc. In particular embodiments, if no target device 108 is captured, no data packet is generated and no information is recorded. In one or more embodiments, a data packet may contain significantly less than 50 KB of data, but may vary depending on the number of target devices 108 captured.

Continuing with FIG. 4, the exemplary data flow continues as the sensor device 102 transmits the data packet through an encrypted channel 406. In one or more embodiments, the channel may be encrypted via any suitable encryption algorithm (e.g., Advanced Encryption Standard, Twofish, Blowfish, RSA, Triple Data Encryption Standard, etc.). In various embodiments, data can be transferred immediately upon capture by the sensor device 102 via a wireless internet (Wi-Fi) connection. In particular embodiments, an Ethernet port or other hard-wired connector (e.g., USB port) may be configured on the sensor device 102 to transfer data via a secure wired connection. In one embodiment, the data may be transferred via a secure protocol (e.g., HTTPS) to a secure database. In certain embodiments, data packets may be transferred as often as they are captured, and may contain multiple rows of data.

In various embodiments, the exemplary data flow continues as the unmodified data packets are transmitted through the encrypted channel to the databases layer 405 where the data packets are stored 408. In particular embodiments, once a data packet arrives in the database, it is encrypted at rest and can only be accessed via password protected accounts. In one embodiment, access may be further limited via IP filtering, such that access may only be granted to a pre-designated set of IP addresses. In particular embodiments, fine grain tuning to access may be enabled through granular data management controls. In these embodiments, this granular level of data management control ensures a high level of compliance with data management best practices.

In one or more embodiments, the system can be configured to handle data via a virtual storage or a local storage. In the event that either an internet connection is unavailable or site protocols require data be stored locally, in various embodiments, the software 212 may be configured to store data 408 locally. In one or more embodiments, for example, a microSD card may be placed in a sensor device 102, and the software 212 can be configured to write to it. In particular embodiments, data on the microSD card may or may not be encrypted.

FIG. 5 illustrates an exemplary flowchart illustrating an exemplary location logic process 500, according to one embodiment of the present disclosure. As will be understood by a person having ordinary skill in the art, the steps and processes shown in FIG. 5 (and those of all other flowcharts and sequence diagrams shown and described herein) may operate concurrently and continuously, are generally asynchronous and independent, and are not necessarily performed in the order shown.

In one embodiment, and as shown in FIG. 5, the exemplary process 500 begins with step 502, where the system is configured to receive an appearance signal for a target device from a first sensor. As used herein, an appearance signal represents a point of first contact between a single sensor and a target device. In one or more embodiments, the appearance signal may include the relative signal strength ("RSSI") of the target device, the unique identifier of the target device, the date and time the signal was received, and any other suitable information. In particular embodiments, the RSSI may facilitate calculation of an approximate distance between the target device and the first sensor. In various embodiments, the system may record the appearance signal in a central device or a database.

At step 504, the system receives an appearance signal for a target device from a second sensor. In one or more embodiments, the second sensor may be in a similar geographical area as the first sensor. In various embodiments, the second sensor receives the appearance signal within a close time proximity to the appearance signal received by the first sensor (e.g., within one second, thirty seconds, one minute, etc.). In some embodiments, the appearance signal may include the RSSI of the target device, the unique identifier of the target device, the date and time the signal was received, and any other suitable information. In particular embodiments, the RSSI may facilitate calculation of an approximate distance between the target device and the second sensor. In various embodiments, the system may record the appearance signal in a central device or a database.

Turning now to step 506, the system is configured to receive a keep-alive signal for a target device from a first sensor. As used in this disclosure, a keep-alive signal represents an ongoing point of contact between a single sensor and a target device. For example, the initial signal a single sensor device receives from a target device is recorded as an appearance signal as described above; any subsequent signal the sensor device receives from the target device is recorded as a keep-alive signal. In some embodiments, the keep-alive signal may include the RSSI of the target device, the unique identifier of the target device, the date and time the signal was received, and any other suitable information. In various embodiments, the system may record the keep-alive signal in a central device or a database.

At step 508, the system receives a keep-alive signal for a target device from a second sensor. In various embodiments, the second sensor receives the keep-alive signal within a close time proximity to the keep-alive received by the first sensor (e.g., within one second, thirty seconds, one minute, etc.). In one or more embodiments, the keep-alive signal may include the RSSI of the target device, the unique identifier of the target device, the date and time the signal was received, and any other suitable information. In various embodiments, the system may record the keep-alive signal in a central device or a database.

At step 510, the system calculates the likely location of the target device. In various embodiments, the system may calculate the likely location of the target device based on the known location of the first sensor device, the known location of the second sensor device, the RSSI of the target device recorded with the appearance signal and keep-alive signal at the first sensor device, the RSSI of the target device recorded with the appearance signal and keep-alive signal at the second sensor device, and any other suitable information.

At step 512, the system is configured to determine a movement vector of the target device. In various embodiments, the movement vector is determined by calculating the distance between the location of the appearance signal received by a first sensor at step 502, and the keep-alive signal received by a first sensor at step 506; calculating the distance between the location of the appearance signal received by a second sensor at step 504, and the keep-alive signal received by a second sensor at step 508; and comparing the position of signals and the calculated distances. In particular embodiments, determining the movement vector may include calculating the angle of change between the appearance signals received at steps 502 and 506 respectively, and the keep-alive signals received at steps 506 and 508 respectively.

At step 514, the system recalculates the likely location of the target device. In various embodiments, the system may recalculate the likely location of the target device based on the movement vector determined in step 512, the known location of the sensor device(s), the RSSI of the target device, and any other suitable information.

In various embodiments, if the signal of the target device is simultaneously (or otherwise close in time) detected by two sensors (e.g., a first sensor and a second sensor), the system may calculate the precise location of the target device. In particular embodiments, if the signal of the target device is simultaneously (or otherwise close in time) detected by three or more sensors, then at step 516, the system is configured to calculate the exact location of the target device. In these embodiments, the system may calculate the exact location of the target device without utilizing a movement vector. In some embodiments, the location logic can also implement feedback loops between two or more steps as necessary.

Sensor Deployment

FIG. 6 represents an exemplary location determination for single sensor detection, according to one embodiment of the present disclosure. In the embodiment shown in FIG. 6, the first contact between a single sensor 102 and a target device 108 is illustrated, where the circle represents the signal range 602 of the sensor device 102. In various embodiments, the target device 108 is located an unknown distance from the sensor device 102, on the represented circle 602. In the embodiment shown in FIG. 6, the target device 108 is not being received by any other sensor devices 102. According to one or more embodiments, this data point is logged as an "appearance" in the dataset.

FIG. 7 illustrates exemplary location determination for two-sensor detection, according to one embodiment of the present disclosure. In various embodiments, two sensor devices 102A and 102B may each detect a target device 108 at multiple locations (e.g., target device 108 at point A and point B). In one or more embodiments, the precise location of the target device 108 may be known as either of the indicated points, but without further data (from additional sensors), exactly which of the two points it is located may remain unknown. In particular embodiments, the distance between the two sensor devices 102A and 102B is known, which facilitates triangulation of the exact distance between the sensor devices and the possible location of the target device 108. In one or more embodiments, combining the known location of the sensor devices 102A and 102B with a series of readings in a short time, may derive a movement vector, which may be used to assist with determining likelihood of location (that is, at which of the two possible locations the device is likely located).

Now referring to FIG. 8, exemplary location determination for multiple-sensor detection is shown, according to one embodiment of the present disclosure. This sort of overlapping deployment pattern, in some embodiments, may be repeated across a space of any size, with a sensor device 102A, 102B, 102C, and 102D located at the center of each circle, whereby each circle represents the maximum signal range 602A, 602B, 602C, and 602D of each respective sensor device. In particular embodiments, this overlapping of signals ensures accurate ongoing automatic corrections to the algorithm described above to account for interference. In at least one embodiment, the automatic correction to the algorithm includes comparing the RSSI's, and the appearance and keep-alive signals received by each sensor device 102A, 102B, 102C, and 102D of the target device 108, such that the projected location of the target device may be adjusted to reflect the locations recorded by the appearance and keep-alive signals received.

As shown in FIG. 8, a methodology for determining the likely location of a target device 108 in a multi-sensor deployment, permits determination of the exact location of the target device 108. In various embodiments, the methodology includes: 1) correcting for variance; 2) comparing the values received across a sample period (e.g., 1 minute, 5 minutes, 15 minutes, etc.); and 3) comparing the corrected value to the known distance of the received signal, such that a relative location may be derived. Additionally, the distances calculated for the target device at point B, based on the known locations and ranges of sensor devices 102A, 102B, and 102D, allow for calculation of distance at point A or any other point covered by sensor devices 102A, 102B, and 102D.

FIG. 9 shows an exemplary geo-fence sensor arrangement, according to one embodiment of the present disclosure. In various embodiments, each circle represents a theoretical maximum range of a sensor device, where the center of each circle is a sensor device 102A-102L. In one or more embodiments, the horizontal lines represent walls 902 of a confined space.

Desired Data Outcomes

The systems and methods described herein may be used for a variety of purposes. The nature of the intended use may determine the number of sensor devices, sensor positioning, and area navigation.

In some embodiments, the methods and systems allow for the tracking of specific target devices in a given target field. This field, also referred to as a geo-fenced location, target location, or simply location, may be of any size, if appropriate sensor device coverage exists. Although three distinct data outcomes are described below for aiding understanding of the systems and methods described herein, such examples should not be interpreted to limit the scope of the use of the technology to only these outcomes.

Entrance/exit reporting is used where the desired outcome is a "time-clock" type of locating within a location with a set number of entrances or exits. This deployment, in various embodiments, relies on the exclusivity of these entrances and exits and typically does not attempt to track time spent in the location. In at least one embodiment, a target device is recorded as the sensor device first tracks a signal ("appearance signal") and any follow-up "keep-alive" or "disappearance" signals are ignored, not being recorded, allowing for a minimal storage footprint. In particular embodiments, subsequent "appearances" are recorded, with the same filtering in place for "keep-alive" or "disappearance" signals.

As this deployment relies on the exclusivity of the entrances and exits, in various embodiments, one sensor per entrance/exit zone is preferred. An entrance/exit zone may be defined as the space a sensor may detect signals across in a given location. The specific area must be defined in each deployment, as interference, structures, and other variations may cause fluctuations. Often, in various embodiments, multiple entrance or exit doors in a small space (such as side by side doors at a retail store) are able to be classified as one entrance/exit zone.

Presence reporting can be used where the desired outcome is to track the entrance and exit of a target device to a target location without an exclusive set of entrance/exit zones. In such embodiments, a geo-fencing or perimeter methodology may be used. In certain embodiments, a target device is tracked when it enters the target location inside of a defined space; in many cases this would be a specialized zone inside of an entrance/exit area. In one or more embodiments, the sensor device tracks the movement of the targeted device in the defined target zone, using RSSI to measure the movement of the device.

For presence reporting, in various embodiments, sensor deployment includes locating sensor devices to cover the perimeter of the target location. In this style of deployment, two or more sensor devices may be employed to cover each area of the perimeter, with a higher degree of accuracy achieved at three or more sensor devices. In particular embodiments, to achieve accurate results, exact relative location of each device may be defined and recorded, for use in the tracking algorithm as defined above.

In various embodiments, location tracking may be used where the desired outcome is to map the path of a target device within a target location. In one or more embodiments, a complex grid of deployment, as shown in FIG. 8, is used, allowing for tracking of entry and egress and all movement within an area. Furthermore, in certain embodiments, this type of deployment allows precise tracking of time in each location and mapping of times and locations. The signals recorded by the sensor devices, in particular embodiments, allow the users to view a comprehensive map of the movements of a mobile device, painting a picture of how a person moved throughout a defined space. In some embodiments, when a target device is first tracked at an entrance, the sensors throughout the space are triggered and record the signals of the device, including when the device ceases movement for any amount of time.

For location tracking, in one or more embodiments, sensor deployment may include placing sensors in a pattern to ensure coverage of target devices by two sensor devices at all times, with optimal results being achieved by coverage of three devices. In various embodiments, exact relative locations of each of the devices may be defined and recorded for use in the tracking algorithm.

Example Applications

Retail

In a retail environment, sensor technology may be deployed to record the movement of devices, and people, in a store. With at least two sensors covering every part of the store, all movement by devices emitting signals inside of the building may be tracked and recorded.

Data collected may be movement through the store, time spent in different sections of the store through perimeter methodology, and entrance/exit reporting with time spent in the retail space. In various embodiments, the system may be used to show how people move throughout the retail space via a graphical user interface, creating thousands of data points for analysis, including: zone performance—how different areas of the store perform; dwell time—how long customers linger in areas; and optimal layout—how the floor plan of the retail space can be changed to cater to customers.

The data points collected from the target devices represent a representation of how customers move inside of a retail space. In one or more embodiments, placing the target device on a grid of the target location may show the movement of the target device relative to the sensor. When compared to a map of layout of the store, the target device may show how the customer moves and interacts with different elements of the target location, allowing for store management to use data to support changes based on how customers spend their time in the retail space.

Medical Office

In a medical park with multiple doctors' offices, the sensors may be utilized to track average wait time for patients. Sensors may be installed at each entrance/exit and throughout the medical area to track the movement of devices in the waiting room and around the entire facility.

When a target device enters the facility, in one embodiment, a "clock in" figure is recorded, then the movement of the device is tracked as it travels from one area into another. In the waiting rooms, prescreening area and examination rooms, geo-fencing allows for presence reporting to occur, tracking when target devices enter the target area. The data points may be analyzed with location tracking, to map the path of the device in a target area and measure movement into other areas of the building.

In one embodiment, the system allows for the wait time of patients in each office to be tracked, and determine precisely how long each practice has its patients waiting. Using geo-fencing allows for the sensor devices to track individual practices independently to gain an accurate reading. With devices installed on entrance/exit doors and covering the entire practice area, the sensors allow a comprehensive look at the time spent in each target location.

In one or more embodiments, the data from the sensor devices include time spent in the waiting room, in the prescreening area, and in the examination room, giving the doctors a measure of how long each patient spends in the office without using other intrusive methodologies. Along with the movement of patients, the sensors may track the movement of medical personnel, showing how each medical professional moves throughout a patient visit.

Hospital

Devices may be deployed in a hospital environment to cover a variety of use cases including, security and appropriate pricing/tracking of procedures, etc.

Staff members in a hospital environment wear badges that can be electronically tagged and associated with distinct individuals. In various embodiments, after such an association occurs, areas may be designated for individuals to enter. If an individual not designated, or an individual without a badge, enters that area, an alert may be sent.

Additionally, in one embodiment, when a procedure occurs (e.g., surgery), the medical professionals responsible for performing the procedure may be tracked. Actual time spent can be tracked against projected time and procedure pricing.

Airport

An airport may deploy the technology to track the movement of travelers through terminals. In one embodiment, the devices are installed at all entrance/exit points in the airport to gain a beginning for each target device in the building. The devices being installed throughout the airport to utilize location tracking for each target device, may create a map of how each device moved in the airport.

The technology is used to analyze movement of individuals from the moment they entered the airport, until they moved onto another aircraft or left the airport. In one embodiment, the information may be analyzed to find how long the average layover is in the airport, what travelers do during those layovers, and how long devices (and their owners) are in the airport.

In various embodiments, devices may be tracked depending on where they entered the airport, from a parking lot or from a terminal gate, then analyzed based on the target location of the target device. Data gathered may provide a look at how passengers, or the public, move inside an airport and the time spent in restaurants, retail areas, or waiting areas. In particular embodiments, the data may also show how travelers spend their time between flights, whether resting or moving through the airport. The data points gathered by the sensor devices may show how the airport caters to individuals—travelers or public—and how people move in the defined space.

Amusement Parks

The technology may be deployed to track the movement, calculate wait times, and alert customer service of needs at an amusement or attraction. In various embodiments, installing the devices throughout the attraction area (park) would allow for passive tracking of each target. Mapping this tracking with coordinates of key areas (attractions, concessions, restrooms, etc.) would allow for accurate wait time tracking in real time for each point of interest. Further, in one embodiment, alerting could be setup to notify janitorial services if a threshold of usage is met in restrooms or other areas critical to customer experience.

In particular embodiments, historic mapping and tracking allows for identification of trouble areas, or choke points at a location, and evaluation of changes in customer flow over time. This historic mapping and tracking data may be used to calculate appropriate staffing requirements, increasing or decreasing as needed for events, higher traffic days, etc. To further this end, external data, such as weather, may be incorporated.

Construction

The technology may be deployed at a construction site to mitigate a number of common challenges. For safety reasons, many construction sites and contractors are moving toward banning cell phones, or other devices that may cause distractions while work is being performed. Construction sites and contractors do, however; often require a badge for identification. In various embodiments, a small Bluetooth tag may be added to existing badges, or a new badge with Bluetooth (or other technology), may be distributed to all who need access to the construction site.

In one embodiment, when a specific "tag" is distributed, the information as to its unique signature and to whom it was given is recorded. Recording this information allows for further reporting. In various embodiments, as soon as individual arrives on site, their location may begin to be tracked. By combining with external data as to trade, certification, employer, etc., reports may be delivered either by individuals or aggregated. The data may then be compared to project plans. Critical path items can be identified and closely tracked, and alerts may be setup if thresholds are not met.

Additionally, in one or more embodiments, historic data allows for evaluation of claims. When a claim is filed, it can be evaluated against precise and accurate records. Furthermore, historic data may further be used for future estimations. When plans are drawn or created, they can be reviewed against similar requests, either as a whole, or by individual sections and components.

City Management

Devices may be deployed throughout a city to monitor traffic and traffic patterns. In various embodiments, cars and traffic may be analyzed as to entry point, exit points, and key points of interest. In the instance of large public buildings (such as sports complexes or arenas), traffic may be analyzed to determine the pattern of individuals that attend events or utilize facilities.

In one embodiment, this data may lead to improved planning of new road construction, and assisting in effectively moving people to and from common destinations. Traffic lights may also be integrated, using the data to efficiently route people to avoid lengthy delays.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" or central computer should be understood to refer to a service point which provides processing, database, and communication facilities. By way of example, and not limitation, the term "server" or central computer can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client device, such as, for example, a smart device, a tag, or an aggregator, may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games. The foregoing is provided to illustrate that claimed subject matter is intended to include a wide range of possible features or capabilities.

Figure 10:
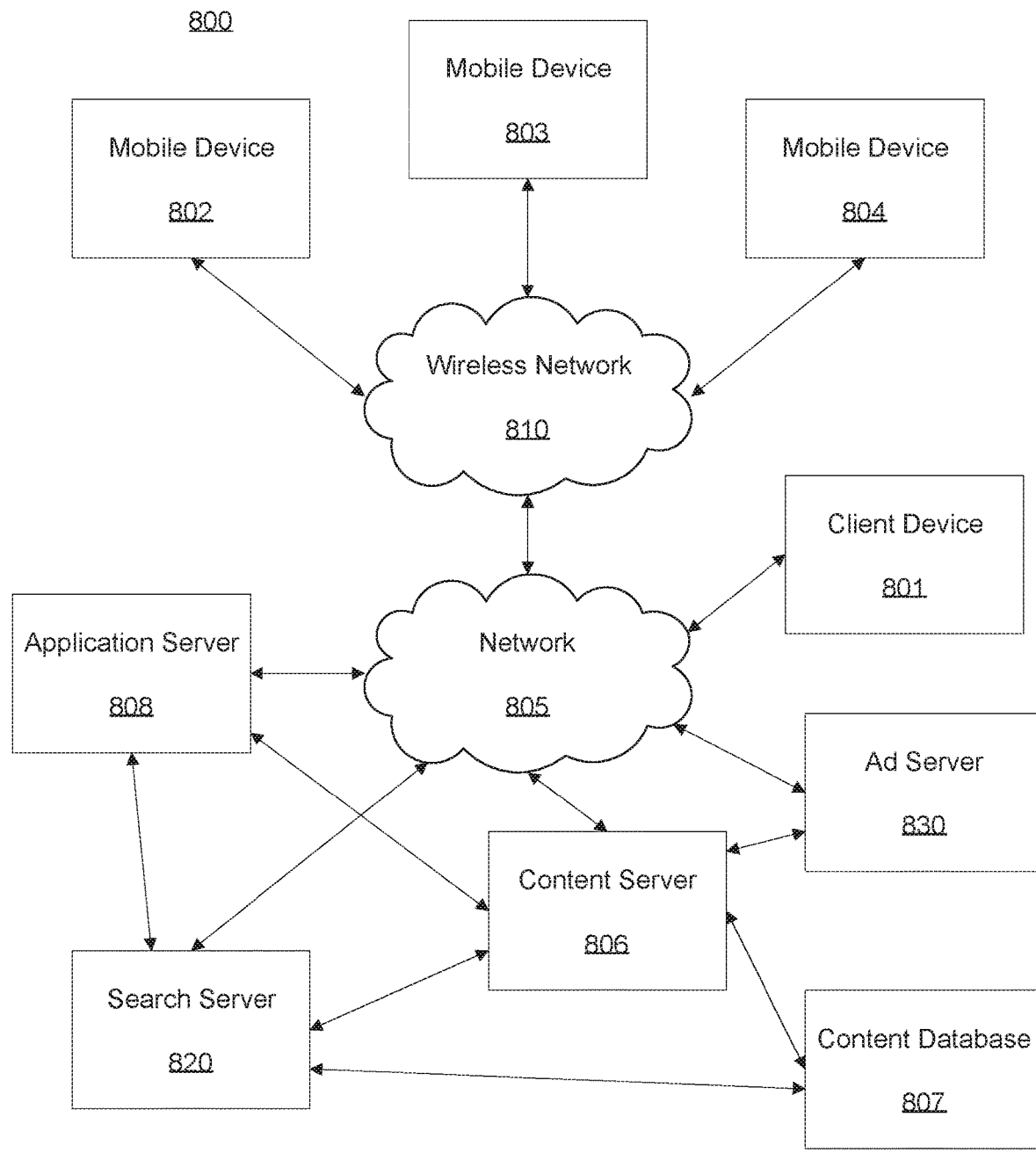
FIG. 10 is an exemplary block diagram illustrating mobile devices and a client device in communication with servers in accordance with various embodiments.

In general, with reference to FIG. 10, a system 800 in accordance with an embodiment of the present disclosure is shown. Not all the components may be required to practice the disclosure, and variations in the arrangement and type of the components may be made without departing from the spirit or scope of the disclosure. As shown, system 800 of FIG. 10 includes local area networks ("LANs")/wide area networks ("WANs")—network 805, wireless network 810, mobile devices (client devices) 802-804 and client device 801. One or more of mobile devices 802-804 and/or client device 801 may be a tag, a smart device, and/or an aggregator. FIG. 10 additionally includes a variety of servers (e.g., central computer), such as content server 806, application (or "App") server 808, search server 820 and advertising ("ad") server 830.

One embodiment of mobile devices 802-804 is described in more detail below. Generally, however, mobile devices 802-804 may include virtually any portable computing device capable of receiving and sending a message over a network, such as network 805, wireless network 810, or the like. Mobile devices 802-804 may also be described generally as client devices that are configured to be portable. Thus, mobile devices 802-804 may include virtually any portable computing device capable of connecting to another computing device and receiving information.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 802-804 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 802-804 may uniquely identify themselves through any of a variety of mechanisms, including a phone number, Mobile Identification Number (MIN), an electronic serial number (ESN), or other mobile device identifier.

In some embodiments, mobile devices 802-804 may also communicate with non-mobile client devices, such as client device 801, or the like. Client device 801 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 801 may also have differing capabilities for displaying navigable views of information.

Client devices 801-804 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 810 is configured to couple mobile devices 802-804 and its components with network 805. Wireless network 810 may include any of a variety of wireless sub-networks that may further overlay stand-alone ad-hoc networks, and the like, to provide an infrastructure-oriented connection for mobile devices 802-804. Such sub-networks may include mesh networks, Wireless LAN (WLAN) networks, cellular networks, and the like.

Network 805 is configured to couple content server 806, application server 808, or the like, with other computing devices, including, client device 801, and through wireless network 810 to mobile devices 802-804. Network 805 is enabled to employ any form of computer readable media for communicating information from one electronic device to another. Also, network 805 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEU1, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 810 and/or 805 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 806 may include a device that includes a configuration to provide content via a network to another device. A content server 806 may, for example, host a site or service, such as streaming media site/service (e.g., Netflix®), an email platform or social networking site, or a personal user site (such as a blog, vlog, online dating site, and the like). A content server 806 may also host a variety of other sites, including, but not limited to business sites, educational sites, dictionary sites, encyclopedia sites, wikis, financial sites, government sites, and the like. Devices that may operate as content server 806 include personal computers desktop computers, multiprocessor systems, microprocessor-based or programmable consumer electronics, network PCs, servers, and the like.

Content server 806 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 808, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Moreover, although FIG. 10 illustrates servers 806, 808, 820 and 830 as single computing devices, respectively, the disclosure is not so limited. For example, one or more functions of servers 806, 808, 820 and/or 830 may be distributed across one or more distinct computing devices. Moreover, in one embodiment, servers 806, 808, 820 and/or 830 may be integrated into a single computing device, without departing from the scope of the present disclosure.

Figure 11:
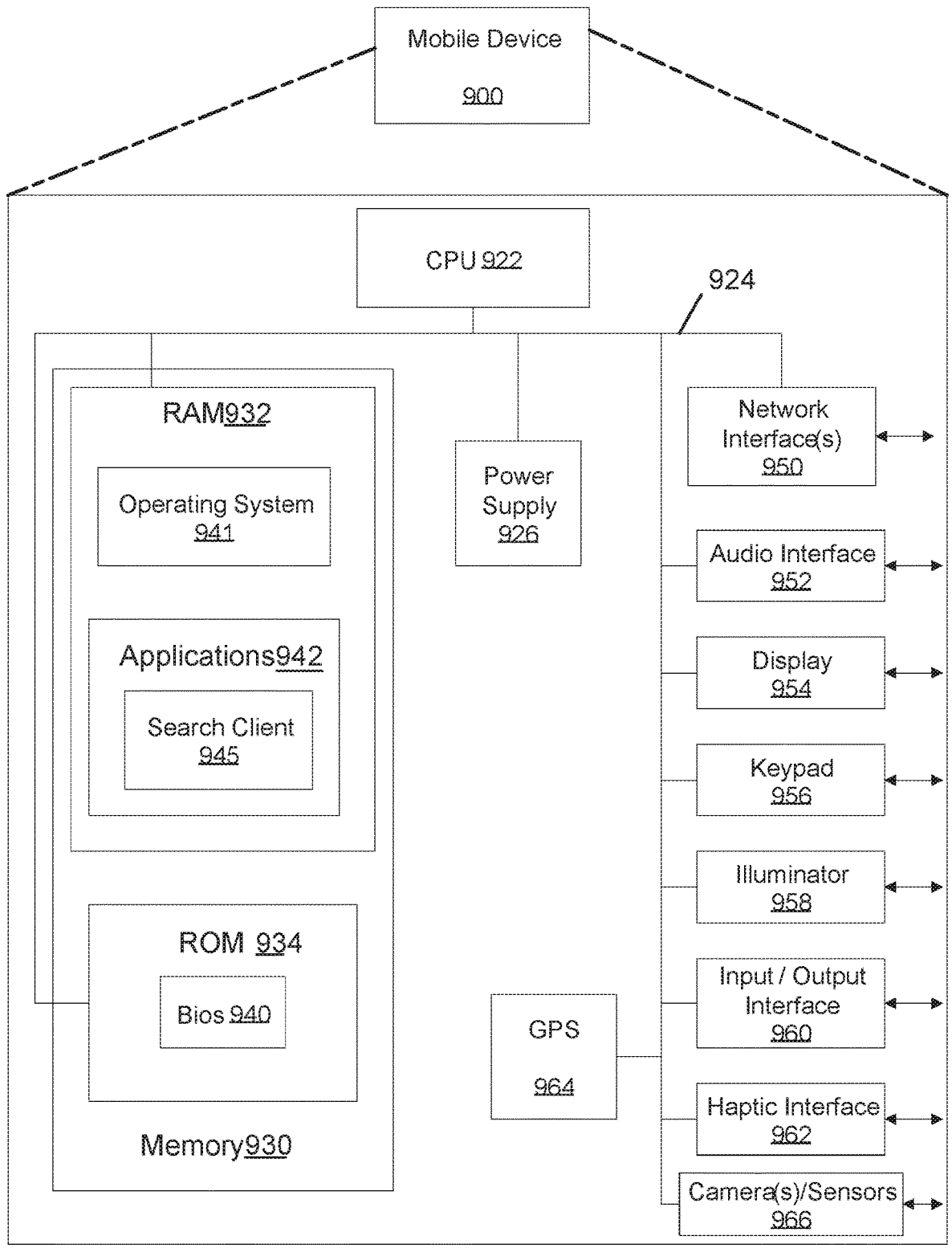
FIG. 11 is an exemplary block diagram illustrating components of a mobile device in accordance with various embodiments.

FIG. 11 is a schematic diagram illustrating a client device showing an example embodiment of a client device that may be used within the present disclosure. Client device 900 may include many more or less components than those shown in FIG. 11. However, the components shown are sufficient to disclose an illustrative embodiment for implementing the present disclosure. Client device 900 may represent, for example, client devices discussed above in relation to FIG. 11.

As shown in the figure, Client device 900 includes a processing unit (CPU) 922 in communication with a mass memory 930 via a bus 924. Client device 900 also includes a power supply 926, one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal or electromagnetic sensors 966. Device 900 can include one camera/sensor 966, or a plurality of cameras/sensors 966, as understood by those of skill in the art. The positioning of the camera(s)/sensor(s) 966 on device 900 can change per device 900 model, per device 900 capabilities, and the like, or some combination thereof.

Power supply 926 provides power to Client device 900. A rechargeable or non-rechargeable battery may be used to provide power. The power may also be provided by an external power source, such as an AC adapter or a powered docking cradle that supplements and/or recharges a battery.

Client device 900 may optionally communicate with a base station (not shown), or directly with another computing device. Network interface 950 includes circuitry for coupling Client device 900 to one or more networks, and is constructed for use with one or more communication protocols and technologies as discussed above. Network interface 950 is sometimes known as a transceiver, transceiving device, or network interface card (NIC).

Audio interface 952 is arranged to produce and receive audio signals such as the sound of a human voice. For example, audio interface 952 may be coupled to a speaker and microphone (not shown) to enable telecommunication with others and/or generate an audio acknowledgement for some action. Display 954 may be a liquid crystal display (LCD), gas plasma, light emitting diode (LED), or any other type of display used with a computing device. Display 954 may also include a touch sensitive screen arranged to receive input from an object such as a stylus or a digit from a human hand.

Keypad 956 may comprise any input device arranged to receive input from a user. For example, keypad 956 may include a push button numeric dial, or a keyboard. Keypad 956 may also include command buttons that are associated with selecting and sending images. Illuminator 958 may provide a status indication and/or provide light. Illuminator 958 may remain active for specific periods of time or in response to events. For example, when illuminator 958 is active, it may backlight the buttons on keypad 956 and stay on while the client device is powered. Also, illuminator 958 may backlight these buttons in various patterns when particular actions are performed, such as dialing another client device. Illuminator 958 may also cause light sources positioned within a transparent or translucent case of the client device to illuminate in response to actions.

Client device 900 also comprises input/output interface 960 for communicating with external devices, such as a headset, or other input or output devices not shown in FIG. 11. Input/output interface 960 can utilize one or more communication technologies, such as USB, infrared, Bluetooth™, or the like. Haptic interface 962 is arranged to provide tactile feedback to a user of the client device. For example, the haptic interface may be employed to vibrate client device 900 in a particular way when the Client device 900 receives a communication from another user.

Optional GPS transceiver 964 can determine the physical coordinates of Client device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS or the like, to further determine the physical location of Client device 900 on the surface of the Earth. It is understood that under different conditions, GPS transceiver 964 can determine a physical location within millimeters for Client device 900; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of Client device 900. The mass memory also stores an operating system 941 for controlling the operation of Client device 900. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 930 further includes one or more data stores, which can be utilized by Client device 900 to store, among other things, applications 942 and/or other data. For example, data stores may be employed to store information that describes various capabilities of Client device 900. The information may then be provided to another device based on any of a variety of events, including being sent as part of a header during a communication, sent upon request, or the like. At least a portion of the capability information may also be stored on a disk drive or other storage medium (not shown) within Client device 900.

Applications 942 may include computer executable instructions which, when executed by Client device 900, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 942 may further include search client 945 that is configured to send, to receive, and/or to otherwise process a search query and/or search result using any known or to be known communication protocols. Although a single search client 945 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 12:
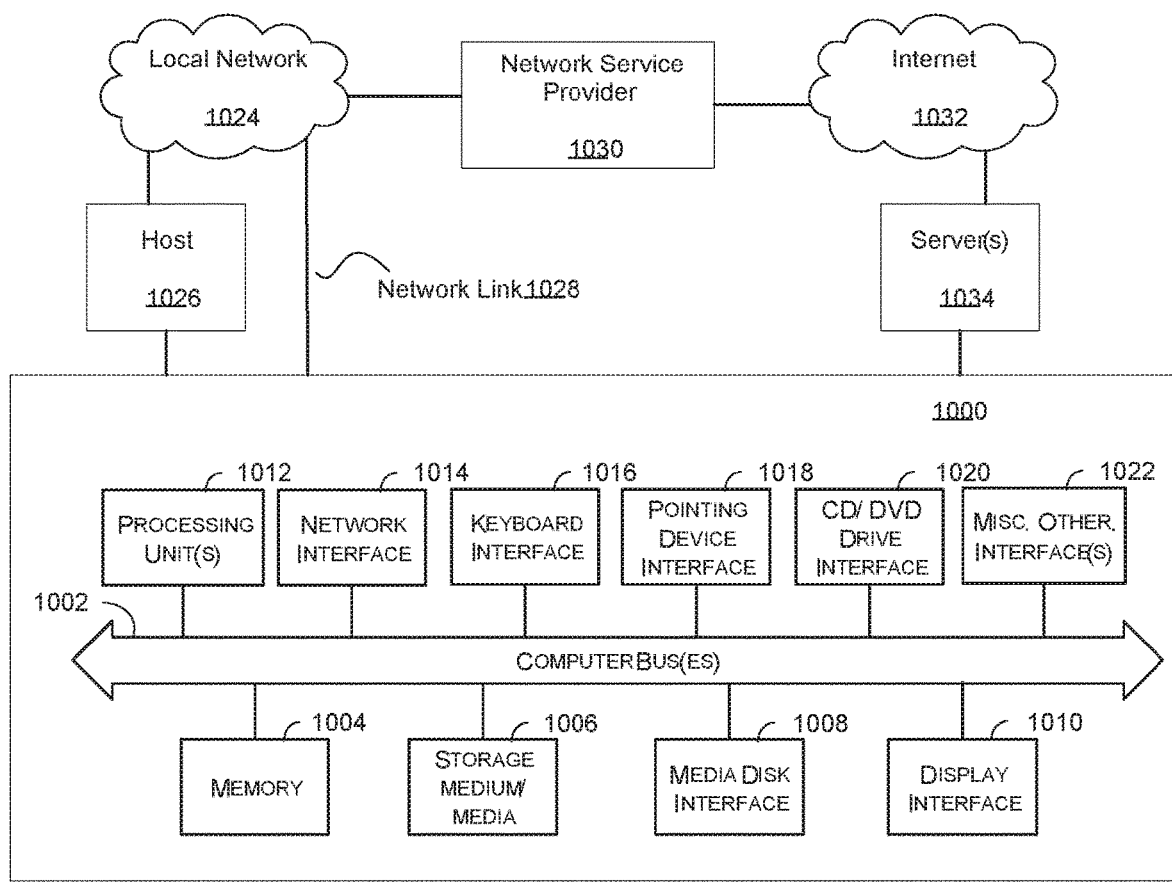
FIG. 12 is an exemplary block diagram of an internal architecture of a computing device in accordance with various embodiments.

As shown in FIG. 12, internal architecture 1000 of a computing device(s), computing system, computing platform and the like can include one or more processing units, processors, or processing cores, (also referred to herein as CPUs) 1012, which interface with at least one computer bus 1002. Also interfacing with computer bus 1002 are, for example, computer readable medium, or media, 1006, network interface 1014, memory 1004, e.g., random access memory (RAM), run-time transient memory, read only memory (ROM), media disk drive interface 1020 as an interface for a drive that can read and/or write to media including removable media such as floppy, CD ROM, DVD, media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

Network link 1028 typically provides information communication using transmission media through one or more networks to other devices that use or process the information. For example, network link 1028 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at display 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system

1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1002 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

In an embodiment, a method comprises creating, by a plurality of radio emitting devices each comprising a processor and transceiver, a geo-fence within a space, each radio emitting device capable of communicating with neighboring radio emitting devices in the plurality and capable of communicating with aggregators in communication with a central server computer over a network; and determining, by a subset of the plurality of radio emitting devices, a location of a user computing device executing a user application for the space when the user computing device is moved past the geo-fence and into the space, the determined location relative to the subset of the radio emitting devices, each radio emitting device in the subset transitioning from a sleep state to an active state when the user computing device moves within a predetermined distance from the subset of the radio emitting devices.

In an embodiment, a radio emitting device comprises a processor; a transceiver for communicating with other radio emitting devices and for communicating with an aggregator in communication with a central server computer over a network; and a storage medium for tangibly storing thereon program logic for execution by the processor, the program logic comprising radio emitting device communicating logic executed by the processor for communicating with a plurality of radio emitting devices to create a geo-fence within a space and for facilitating determination of a location of a user computing device by the radio emitting device and a subset of the plurality of radio emitting devices, the user computing device executing a user application for the space, the facilitating determination of the location occurring when the user computing device is moved past the geo-fence and into the space, the determined location relative to the radio emitting device, the radio emitting device transitioning from a sleep state to an active state when the user computing device moves within a predetermined distance from the subset of the radio emitting devices.

In an embodiment, a non-transitory computer readable storage medium tangibly storing thereon computer instructions for execution by a processor of a radio emitting device, the computer instructions comprising communicating with a plurality of radio emitting devices to create a geo-fence within a space and for facilitating determination of a location of a user computing device by the radio emitting device and a subset of the plurality of radio emitting devices, the user computing device executing a user application for the space, the facilitating determination of the location occurring when the user computing device is moved past the geo-fence and into the space, the determined location relative to the radio emitting device, the radio emitting device transitioning from a sleep state to an active state when the user computing device moves within a predetermined distance from the subset of the radio emitting devices.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

CONCLUSION

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. A method for facilitating location-tracking of wireless electronic devices, comprising the steps of:
   receiving a first signal at a first electronic sensor device from a wireless electronic device, the first signal comprising a first measure of relative signal strength ("RSSI") emitted by the wireless electronic device, wherein the first electronic sensor device is located at a first position within an area;
   receiving a second signal at the first electronic sensor device from the wireless electronic device, the second signal comprising a second measure of RSSI emitted by the wireless electronic device, wherein the first signal and the second signal are received by the first electronic sensor device within a predetermined acceptable time period, and wherein the first measure of RSSI is different from the second measure of RSSI;
   receiving a third signal at a second electronic sensor device from the wireless electronic device, the third signal comprising a third measure of RSSI emitted by the wireless electronic device, wherein the second electronic sensor device is located at a second position within the area;
   receiving a fourth signal at the second electronic sensor device from the wireless electronic device, the fourth signal comprising a fourth measure of RSSI emitted by the wireless electronic device, wherein the third signal and the fourth signal are received by the second electronic sensor device within the predetermined acceptable time period, and wherein the third measure of RSSI is different from the fourth measure of RSSI; and
   determining an estimated location of the wireless electronic device in the area based on the first position and second position of the first electronic sensor device and the second electronic sensor device, a change between the first measure of RSSI and the second measure of RSSI, and a change between the third measure of RSSI and the fourth measure of RSSI.

2. The method of claim 1, wherein each of the first signal, the second signal, the third signal, and the fourth signal comprise passive signals.

3. The method of claim 2, wherein passive signals comprise signals not actively initiated by a user of the wireless electronic device.

4. The method of claim 1, wherein each of the first signal, the second signal, the third signal, and the fourth signal further comprise a unique identifier that identifies the wireless electronic device.

5. The method of claim 1, wherein each of the first signal, the second signal, the third signal, and the fourth signal further comprise respective date/time stamps to confirm that the signals are received by the first electronic sensor device and the second electronic sensor device within the predetermined acceptable time period.

6. The method of claim 1, further comprising the step of determining a movement vector of the wireless electronic device.

7. The method of claim 6, wherein the movement vector is determined by calculating an angle of change between the first signal and the second signal, and also the third signal and the fourth signal.

8. The method of claim 7, further comprising the step of updating the estimated location of the wireless electronic device based on the movement vector.

9. The method of claim 1, further comprising the steps of:
   receiving a fifth signal at a third electronic sensor device from the wireless electronic device, the fifth signal comprising a fifth measure of RSSI emitted by the wireless electronic device, wherein the third electronic sensor device is located at a third position within the area;
   receiving a sixth signal at the third electronic sensor device from the wireless electronic device, the sixth signal comprising a sixth measure of RSSI emitted by the wireless electronic device, wherein the fifth signal and the sixth signal are received by the third electronic sensor device within the predetermined acceptable time period; and
   determining an updated location of the wireless electronic device in the area based on the first position, second position, and third position of the first electronic sensor device, the second electronic sensor device, and the third electronic sensor device, as well as a change between the first measure of RSSI and the second measure of RSSI, a change between the third measure of RSSI and the fourth measure of RSSI, and a change between the fifth measure of RSSI and the sixth measure of RSSI.

10. The method of claim 1, wherein the electronic sensor devices are capable of reading passive signals from the wireless device.

11. A system for facilitating location-tracking of wireless electronic devices, comprising:
   a first electronic sensor device located at a first position within an area, the first electronic sensor device operative to:
      receive a first signal from a wireless electronic device, the first signal comprising a first measure of relative signal strength ("RSSI") emitted by the wireless electronic device; and
      receive a second signal from the wireless electronic device, the second signal comprising a second measure of RSSI emitted by the wireless electronic device, wherein the first signal and the second signal are received by the first electronic sensor device within a predetermined acceptable time period, and wherein the first measure of RSSI is different from the second measure of RSSI;
   a second electronic sensor device located at a second position within the area, the second electronic sensor device operative to:
      receive a third signal from the wireless electronic device, the third signal comprising a third measure of RSSI emitted by the wireless electronic device; and
      receive a fourth signal from the wireless electronic device, the fourth signal comprising a fourth measure of RSSI emitted by the wireless electronic device, wherein the third signal and the fourth signal are received by the second electronic sensor device within the predetermined acceptable time period, and wherein the third measure of RSSI is different from the fourth measure of RSSI; and
   a central server in operative communication with the first electronic sensor device and the second electronic sensor device, wherein the central server comprises a processor and is operative to determine an estimated location of the wireless electronic device in the area based on the first position and second position of the first electronic sensor device and the second electronic sensor device, a change between the first measure of RSSI and the second measure of RSSI, and a change between the third measure of RSSI and the fourth measure of RSSI.

12. The system of claim 11, wherein each of the first signal, the second signal, the third signal, and the fourth signal comprise passive signals.

13. The system of claim 12, wherein passive signals comprise signals not actively initiated by a user of the wireless electronic device.

14. The system of claim 11, wherein each of the first signal, the second signal, the third signal, and the fourth signal further comprise a unique identifier that identifies the wireless electronic device.

15. The system of claim 11, wherein each of the first signal, the second signal, the third signal, and the fourth signal further comprise respective date/time stamps to confirm that the signals are received by the first electronic sensor device and the second electronic sensor device within the predetermined acceptable time period.

16. The system of claim 11, wherein the central server is further operative to determine a movement vector of the wireless electronic device.

17. The system of claim 16, wherein the movement vector is determined by calculating an angle of change between the first signal and the second signal, and also the third signal and the fourth signal.

18. The system of claim 17, wherein the central server is further operative to update the estimated location of the wireless electronic device based on the movement vector.

19. The system of claim 11, further comprising:
a third electronic sensor device located at a third position within the area, the third electronic sensor device operative to:
receive a fifth signal from the wireless electronic device, the fifth signal comprising a fifth measure of RSSI emitted by the wireless electronic device; and
receive a sixth signal from the wireless electronic device, the sixth signal comprising a sixth measure of RSSI emitted by the wireless electronic device, wherein the fifth signal and the sixth signal are received by the third electronic sensor device within the predetermined acceptable time period; and
the central server operative to determine an updated location of the wireless electronic device in the area based on the first position, second position, and third position of the first electronic sensor device, the second electronic sensor device, and the third electronic sensor device, as well as a change between the first measure of RSSI and the second measure of RSSI, a change between the third measure of RSSI and the fourth measure of RSSI, and a change between the fifth measure of RSSI and the sixth measure of RSSI.

20. The system of claim 11, wherein the electronic sensor devices are capable of reading passive signals from the wireless device.

* * * * *